G. RATHMAN.
COFFEE PERCOLATOR.
APPLICATION FILED OCT. 23, 1916.

1,226,005.

Patented May 15, 1917.

Gilbert Rathman, Inventor
By his Attorneys

UNITED STATES PATENT OFFICE.

GILBERT RATHMAN, OF NEW YORK, N. Y., ASSIGNOR OF THREE-TENTHS TO WILLIAM HODGKINSON AND FOUR-TENTHS TO JAMES A. BROWN, BOTH OF NEW YORK, N. Y.

COFFEE-PERCOLATOR.

1,226,005.

Specification of Letters Patent.  Patented May 15, 1917.

Application filed October 23, 1916. Serial No. 127,083.

*To all whom it may concern:*

Be it known that I, GILBERT RATHMAN, a citizen of the United States, and resident of the borough of Manhattan, city, county, and State of New York, have invented certain new and useful Improvements in Coffee-Percolators, of which the following is a specification.

This invention relates to coffee percolators, and is especially adapted for use in connection with large percolators employed in lunch rooms, restaurants and the like, for making coffee in large quantities.

The principal object of the invention is the provision of a percolator having means for creating a circulation of the water used in making the coffee, through the ground coffee in the coffee bag.

Another important object of the invention is the provision of means for regulating the number of times the liquid shall be circulated through the ground coffee in the coffee bag, in order that coffee of uniform quality and strength may be made.

A further object of the invention is the provision of a system of piping through which the liquid is drawn from the lower portion of the coffee receptacle and discharged into the coffee bag at the upper end of the coffee receptacle or tank, said piping system having a pump therein for creating a forced circulation of the liquid through the piping. An important feature of my invention consists in the provision of a centrifugal pump for circulating the liquid, and arranging the piping system and pump so that coffee will not be trapped in the circulating system but will drain downwardly therethrough to the discharge faucet of the percolator as the level of the coffee in the coffee receptacle falls.

A further object of the invention is the provision of a centrifugal liquid-forcing pump so constructed that coffee will drain therethrough when the pump is stationary, and so arranging the driving connections and the bearings for the pump shaft that the employment of packing and stuffing boxes at points where the packing would come in contact with the coffee, is avoided.

Figure 1:
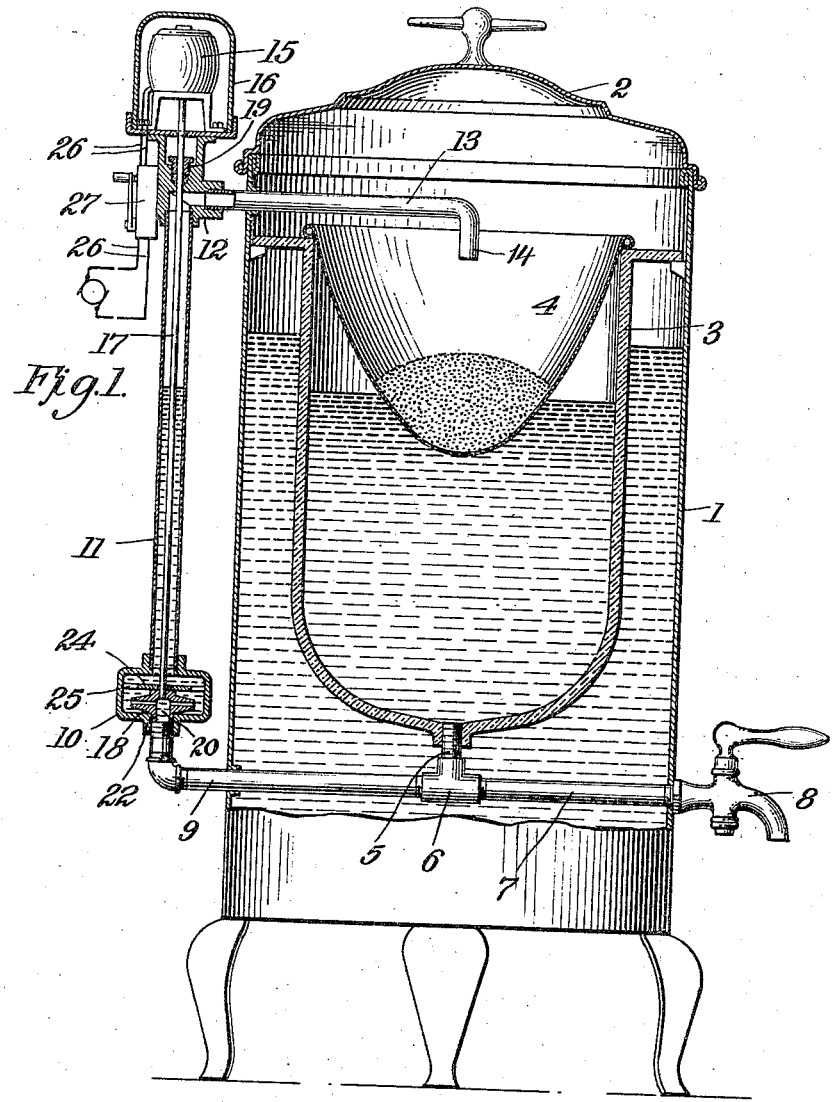
Figure 2:
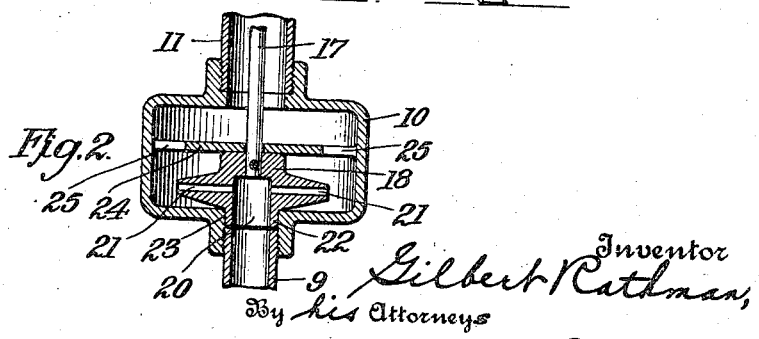

In the drawings, Figure 1 is a side elevation, partly in vertical section, of the percolator; and Fig. 2 a detail vertical sectional view through the pump chamber and pump.

Referring to the various parts by numerals, 1 designates the outer casing or hot water tank of the percolator, having the usual removable top 2 and the inner coffee receptacle or tank 3, at the top of which is supported the bag 4 for holding the ground coffee.

At the bottom of the inner coffee receptacle 3 is an outlet 5 leading to a T-fitting 6, to one branch of which is connected a horizontal pipe 7 extending outwardly through the casing 1 and provided at its outer end with a suitable faucet 8. A second horizontal pipe 9 is connected to the remaining member of the fitting 6, and this pipe extends outwardly through the wall of the casing 1 and is connected at its outer end to the bottom of a chamber or pump casing 10. A vertical pipe 11 is connected at its lower end with the top of the chamber 10, and at its upper end with a fitting 12 to which is connected the outer end of a horizontal pipe 13 which extends through the wall of the casing 1 and terminates in a downwardly turned nozzle 14 at a point above the coffee bag 4.

Mounted on the top of the fitting 12 is an electric motor 15, preferably inclosed in a suitable casing 16. The rotor of the motor is connected with a vertical drive shaft 17 extending downwardly through the fitting 12 and pipe 11 and connected at its lower end to a centrifugal pump 18 mounted in the chamber 10. A suitable stuffing box 19 is provided at the point where the pump shaft passes through the wall of the fitting 12, and it will be observed that this stuffing box is above the highest level attained by the coffee.

I prefer to construct the pump in the form of a horizontally disposed rotor having an axial inlet 20 in its lower face and a series of radial outlet passages 21 communicating with said inlet at their inner ends, and with the periphery of the rotor at their discharge ends. The lower face of the rotor is provided with a depending hollow hub 22, journaled in a bearing 23 in the casing 10. The casing 10 is divided into two compartments by a horizontal plate or diaphragm 24 extending across the chamber above the pump. The diaphragm 24 is provided with a series of apertures 25 around the edge thereof adjacent to the wall of the casing, through which the liquid discharged through the outlets 21 of the pump is forced. The imperforate central portion of the diaphragm prevents the formation of eddy currents above the pump, and also serves to hold the pump rotor in position.

The electric motor 15 is connected with a suitable source of current by the conducting wires 26, and a suitable time switch 27 is placed in the motor circuit to control the length of time the motor shall run at each operation.

It will be obvious that by setting the time switch so that it will stop the motor after it has run a predetermined time, it is possible for the operator to make coffee of the desired strength by simply placing the proper amount of ground coffee and water in the percolator and throwing the switch to close the motor circuit, no further attention from the operator being required. This not only results in a saving of the time of the attendant, but insures the making of coffee of the desired quality. I prefer to employ a time switch which may be set to stop the motor after it has run for periods of varying lengths, so that the liquid may be circulated through the ground coffee as long as may be desired.

It will be observed that by the construction shown and described I have provided means for drawing the liquid from the bottom of the coffee tank and discharging it into the coffee bag. An important feature of the invention consists in the construction and arrangement of the circulating apparatus so that no coffee will be trapped in the circulating system where it would become sour and stale and affect the quality and flavor of coffee subsequently made in the percolator. It will be observed that all of the piping of the circulating system is above the outlet of the discharge faucet, and that the coffee will drain down through the piping and pump to the discharge faucet as the coffee is drawn off. The pump is constructed so as to allow the coffee in the pipe 11 to drain therethrough, the level of the coffee in the pipe being always the same as the coffee level in the receptacle 3.

By arranging the pump and its driving apparatus as shown, with the pump shaft extending upwardly through the circulating pipe and connected to a motor mounted at one side of the percolator at a point above the highest point attainable by the coffee, the use of packing for the pump shaft at points below the coffee level is avoided. By so mounting the motor and drive shaft, contact of the coffee with the packing is avoided and, moreover, danger of leakage at points likely to cause injury to the motor and time switch, or affect the operation thereof, is avoided.

What I claim is:

1. In a coffee percolator, the combination of a casing, a liquid holding tank therein, a coffee bag supported above said tank, a conduit connected at its lower end with the lower portion of said tank and terminating at a point above the coffee bag, a pump in said conduit having an unobstructed liquid passage therethrough, and means for driving said pump to draw liquid from the tank and return it thereto through the coffee bag, and a coffee off-take connected with the lower end of said tank, whereby when the tank is drained through said off-take, the pump and conduit are also drained.

2. In a coffee percolator, the combination of a casing, a liquid receptacle therein having an open top, a coffee bag supported at the top of said receptacle, a coffee off-take connected at one end with the lower portion of the receptacle and extending laterally through the casing, a liquid circulating conduit connected at its lower end with said off-take and extending upwardly to a point above the coffee bag, a pump in said circulating conduit having an unobstructed passage therethrough, a motor for operating said pump to draw liquid from the lower portion of said receptacle and return it thereto through the coffee bag, and time-controlled means for automatically stopping said motor after a predetermined period of operation.

3. In a coffee percolator, the combination of a casing, a liquid receptacle therein having an open upper end, a coffee bag supported over said receptacle, a coffee off-take connected at one end with the lower portion of said receptacle and having a faucet at its outer end, a vertically extending liquid circulating conduit connected at its lower end with said off-take, and having a lateral extension on its upper end adapted to discharge the liquid into the coffee bag, a rotary pump in said circulating conduit having an unobstructed liquid passage therethrough, an electric motor for operating said pump, and a time-controlled switch for automatically stopping said motor after a predetermined period of operation.

4. In a coffee percolator, the combination of a casing, a liquid receptacle therein having an open upper end, a coffee bag supported over said receptacle, a coffee off-take connected at one end with the lower portion of said receptacle and having a faucet at its outer end, a vertically extending liquid circulating conduit connected at its lower end with said off-take, and having a lateral extension on its upper end adapted to discharge the liquid into the coffee bag, a horizontally disposed rotary pump mounted in said vertically extending conduit and having an unobstructed passage therethrough, a drive shaft connected at its lower end to said pump and extending upwardly through the upper end of said vertical conduit, and an electric motor supported above the upper end of said vertical conduit and connected with the upper end of said pump shaft to drive the pump.

In testimony whereof I hereunto affix my signature.

GILBERT RATHMAN.